Patented July 28, 1942

2,290,952

UNITED STATES PATENT OFFICE 2,290,952

PRODUCTION OF COLORED TEXTILE AND OTHER MATERIALS

George Holland Ellis and Frank Brown, Spondon, near Derby, England, assignors to Celanese Corporation of America, a corporation of Delaware No Drawing. Application July 26, 1938, Serial No. 221,362. In Great Britain September 1, 1937

8 Claims. (Cl. 106—165)

This invention relates to the production of coloured materials of cellulose esters or ethers and more particularly coloured filaments, straws, foils or similar materials such as can be produced by extruding a solution of a cellulose ester or ether into a setting medium.

We have found that such coloured materials of great value may be obtained from cellulose ester or ether solutions having dissolved therein dyes which have little or no direct affinity for cellulose esters or ethers when applied by ordinary dyeing methods, and particularly substantive cotton dyes or other sulphonated dyes.

Coloured cellulose ester or ether materials may thus be obtained of which the colour is of excellent fastness to rubbing and to aqueous treatments such as soaping. In respect of these properties the materials are much better than would be expected from a consideration of the fastness of dyeings produced with the dyestuffs on materials for which they have direct dyeing affinity. Further, the fact that the dyestuff is in solution in the cellulose ester or ether solvent avoids some of the well-known difficulties associated with the spinning of artificial silk from cellulose ester or ether solutions containing pigments in suspension. It is well-known that, in producing pigmented cellulose ester or ether materials by this method, difficulty is often experienced in obtaining and maintaining the pigment in a sufficiently finely divided state and sufficiently uniformly distributed throughout the cellulose ester or ether solution.

The preparation of the cellulose ester or ether solution containing the dyestuffs may be effected in various ways. For example the dye may be dissolved in the acetone, acetone-water mixture (e. g. a 95/5 acetone-water mixture), or other solvent to be used, if desired after dissolving a portion of the cellulose ester or ether therein, and the solution used to dissolve the cellulose ester or ether or the remainder thereof. Again, an intimate mixture of the dye and cellulose ester or ether may be prepared, e. g. by milling, and the mixture dissolved in the solvent. If desired the dye may be brought into intimate mixture with a part of the cellulose ester, with or without a portion of the solvent, and the mixture mixed with the solvent or the remainder of the solvent before, at the same time as, or after dissolving the remainder of the cellulose ester or ether. A convenient way of preparing an intimate mixture of dye and cellulose ester or ether is to work them together, e. g. by kneading, rolling or the like, with addition of sufficient cellulose ester or ether solvent to form a dough, the mechanical treatment being continued, while evaporating solvent, until the product can be ground to powder. After grinding, the mixture can be incorporated with the requisite solvent and further quantity of cellulose ester or ether as indicated above.

The conversion of the cellulose ester or ether solutions containing the dissolved dyestuffs into filaments, films and the like may be effected either by dry or by wet methods; for instance artificial filaments may be produced by spinning the solutions into suitable evaporative atmospheres or by spinning them into suitable coagulating baths, i. e. baths which do not dissolve the dyestuff out of the spun materials.

As previously indicated the present invention enables cellulose ester or ether materials to be coloured with the aid of substantive cotton dyes or other sulphonated dyes. For instance there may be used in the process of the invention Pontamine Diazo Scarlet A (Schultz, Farbstofftabellen 7th edn., No. 87), Primuline (Schultz, Farbstofftabellen 7th edn., No. 932), Rosophenine 4B (Color Index No. 604), or Stilbene Yellow 3 G. X. (Schultz, Farbstofftabellen 7th edn., No. 706). However, the new method is in the main directed to the production of materials having a grey or like neutral shade. Such grey tinted materials can subsequently be coloured in dark shades, for example navy blue, dark brown, bottle green or deep maroon, by applying thereto comparatively small proportions of dyes having direct affinity for the cellulose ester or ether. By these means a wide range of dark shades of very good fastness to rubbing can be obtained very economically. On the other hand, as is well-known, the production of dark shades on cellulose ester or ether materials with direct dyeing dyestuffs, almost invariably involves the use of very large proportions of dyestuff and is both costly and very liable to lead to shades of indifferent fastness to rubbing.

For the production of grey tinted materials suitable for subsequent colouring in deep shades in this manner, the dyestuff dissolved in the cellulose ester or ether solution should be of such nature and employed only in such proportion as to yield the desired grey tint and not in the proportions necessary to give the full tint of the dyestuff. It will be appreciated that it is not necessary to prepare a different grey material for every deep shade it is required to produce. A single grey tinted material can be coloured in a very wide range of shades by the application of suitable direct dyeing topping colours and, as stated above, these will usually be required in comparatively small proportion.

For dissolving in acetone solutions of cellulose acetate to be used for the production of grey cellulose acetate filaments by dry spinning or other methods, particularly suitable dyestuffs are Carbide Black D. (Clayton Aniline Co.), compare Schultz, Farbstofftabellen, 7th edn. No. 555, and Carbide Black E. (Clayton Aniline Co.), compare Colour Index No. 581. Very useful grey shades can be obtained by employing one of these dyestuffs in the proportion of about 0.5% based on the weight of the cellulose acetate in the solution. A particularly valuable neutral grey tint can be secured by employing a mixture of those two dyestuffs, for example a mixture of about equal parts of each. Other dyestuffs suitable for use in producing a grey shade are Neolan Black W. A. (Schultz, Farbstofftabellen 7th edn., vol. II, page 154, being referred to as "Neolanschwarz WA"), Neolan Black W. A. G. A. (Society of Chemical Industry in Basle, Publication No. 990, No. 5), and Neolan Black W. A. B. (Society of Chemical Industry in Basle, Publication No. 990, No. 8), the first of these three dyestuffs being especially useful with acetone solutions of cellulose acetate.

The grey shade of cellulose acetate materials so produced can be discharged with formaldehyde sulphoxylate discharging agents. This is of great advantage since the presence of the dyestuff in the material is not a bar to the production of white or coloured discharge effects upon the grey materials after they have been topped with direct dyeing dyestuffs providing of course that the direct dyeing dyestuffs employed are themselves dischargeable.

The topping of the grey tinted cellulose ester or ether materials of the invention may be effected with various direct dyeing dyestuffs for cellulose esters or ethers, for example the water insoluble dyestuffs of the nitro-diarylamine, azo, or amino anthraquinone series, such as are extensively employed for the colouration of cellulose acetate materials. The topping colouring matter may be applied either uniformly or locally according to the effects it is desired to produce. The topping colours may be applied, for instance, in aqueous solution or dispersion according to their nature, or in solution in organic solvents as described, for example, in U. S. Patents Nos. 1,738,978 and 1,927,145 and U. S. application S. No. 89,661 filed July 8, 1936.

The invention is of particular value in connection with the production of cellulose acetate filaments, foils and the like. It may, however, be applied in the production of filaments, foils and the like of other cellulose esters, for example cellulose formate, propionate or butyrate, or cellulose ethers, for example methyl, ethyl or benzyl cellulose. The grey or otherwise coloured filaments may be converted into yarns or fabrics either alone or in association with other types of textile material, for example uncoloured cellulose ester or ether filaments or regenerated cellulose, cotton, wool or silk. In the case of textile materials containing both the coloured cellulose ester or ether filaments and other materials a wide range of colour effects may be produced thereon by application of dyestuffs or mixtures of dyestuffs suitably selected according to the dyeing properties of the various components of the materials.

The following example illustrates the process of the invention as applied to the colouration of artificial filaments of cellulose acetate:

*Example*

Carbide Black D (Schultz, 1931, No. 555) is extracted with cold water to remove the solid diluent which is present in this commercial product. The residual dyestuff is then recrystallised from hot water. 100 parts by weight of the dyestuff thus purified are incorporated with 900 parts by weight of a 4% weight for weight solution of cellulose acetate in acetone and the paste is milled to effect thorough incorporation of the dyestuff in the paste.

The paste is incorporated in a spinning solution of cellulose acetate in acetone in such a quantity that 0.5% of the dyestuff is included in the yarn obtained by spinning the solution into an evaporative atmosphere.

The yarn obtained has a medium grey colour and can be overdyed by direct dyeing with appropriate dyestuffs for the production of direct shades. For example, the yarn is scoured in a soap solution for 15 minutes at 75° C. and dyed in the same bath with 0.2% of 1-amino 2-methyl anthraquinone on the weight of the materials. Dyeing is continued at 75° C. for an hour, the goods being subsequently rinsed in soft water and dried. The yarn obtained has a full rich brown shade.

Having described our invention, what we desire to secure by Letters Patent is:

1. A spinning solution comprising a cellulose derivative selected from the group consisting of cellulose esters and cellulose ethers, a solvent medium therefor and dissolved in said solvent medium, a sulfonated substantive cotton dyestuff having no direct affinity for the cellulose derivative selected from the group consisting of Carbide Black D, Carbide Black E, Neolan Black W. A., Neolan Black W. A. G. A. and Neolan Black W. A. B.

2. A spinning solution comprising cellulose acetate, a solvent medium therefor and dissolved in said solvent medium, a sulfonated substantive cotton dyestuff having no direct affinity for the cellulose acetate selected from the group consisting of Carbide Black D, Carbide Black E, Neolan Black W. A., Neolan Black W. A. G. A. and Neolan Black W. A. B.

3. A spinning solution comprising a cellulose derivative selected from the group consisting of cellulose esters and cellulose ethers, a solvent medium therefor and dissolved in said solvent medium, a sulfonated substantive cotton dyestuff having no direct affinity for the cellulose derivative selected from the group consisting of Carbide Black D, Carbide Black E, Neolan Black W. A., Neolan Black W. A. G. A. and Neolan Black W. A. B., said dyestuff being present in such quantity as to produce a neutral grey shade on filaments, straws, foils or the like produced by spinning the solution into a setting medium.

4. A spinning solution comprising cellulose acetate, a solvent medium therefor and dissolved in said solvent medium, a sulfonated substantive cotton dyestuff having no direct affinity for the cellulose acetate selected from the group consisting of Carbide Black D, Carbide Black E, Neolan Black W. A., Neolan Black W. A. G. A. and Neolan Black W. A. B., said dyestuff being present in such quantity as to produce a neutral grey shade on filaments, straws, foils or the like produced by spinning the solution into a setting medium.

5. Filaments, straws and foils of a cellulose derivative selected from the group consisting of cellulose esters and cellulose ethers having distributed throughout their substance a sulfonated substantive cotton dyestuff having no direct affinity for the cellulose derivative selected from the group consisting of Carbide Black D, Carbide Black E, Neolan Black W. A., Neolan Black W. A. G. A. and Neolan Black W. A. B.

6. Filaments, straws and foils of cellulose acetate having distributed throughout their substance a sulfonated substantive cotton dyestuff having no direct affinity for the cellulose acetate selected from the group consisting of Carbide Black D, Carbide Black E, Neolan Black W. A., Neolan Black W. A. G. A. and Neolan Black W. A. B.

7. Filaments, straws and foils of a cellulose derivative selected from the group consisting of cellulose esters and cellulose ethers having distributed throughout their substance a sulfonated substantive cotton dyestuff having no direct affinity for the cellulose derivative selected from the group consisting of Carbide Black D, Carbide Black E, Neolan Black W. A., Neolan Black W. A. G. A. and Neolan Black W. A. B. in such amount as to impart a neutral grey shade thereto.

8. Filaments, straws and foils of cellulose acetate having distributed throughout their substance a sulfonated substantive cotton dyestuff having no direct affinity for the cellulose acetate selected from the group consisting of Carbide Black D, Carbide Black E, Neolan Black W. A., Neolan Black W. A. G. A. and Neolan Black W. A. B. in such amount as to impart a neutral grey shade thereto.

GEORGE HOLLAND ELLIS.
FRANK BROWN.